United States Patent [19]

Fallon et al.

[11] Patent Number: 4,928,850
[45] Date of Patent: May 29, 1990

[54] GAS BLENDING APPARATUS

[75] Inventors: Merton R. Fallon, Woodland Hills, Calif.; Thomas W. Clements, Ambler, Pa.

[73] Assignee: McDantim, Inc., Woodland Hills, Calif.

[21] Appl. No.: 346,538

[22] Filed: May 2, 1989

Related U.S. Application Data

[63] Continuation-in-part of Ser. No. 201,002, Jun. 1, 1988, Pat. No. 4,874,116.

[51] Int. Cl.$^5$ .............................................. B67B 7/24
[52] U.S. Cl. ........................................ 222/3; 222/57; 222/145; 222/396; 222/399; 261/64.3; 261/16; 261/DIG. 7; 137/114
[58] Field of Search ...................... 222/55, 57, 61, 145, 222/152, 394, 396, 399, 3; 261/16, 64.3, DIG. 7; 137/114, 88

[56] References Cited

U.S. PATENT DOCUMENTS

| | | | |
|---|---|---|---|
| 3,534,753 | 10/1970 | Ollivier | 137/114 X |
| 3,643,677 | 2/1972 | Begleiter | 137/114 X |
| 3,738,107 | 6/1973 | Miller | 137/114 X |
| 4,015,617 | 4/1977 | Connolly | 137/88 |
| 4,364,493 | 12/1982 | Raynes et al. | 222/399 |
| 4,827,965 | 5/1989 | Wates | 137/114 X |
| 4,874,116 | 10/1989 | Fallon et al. | 222/399 |

Primary Examiner—Joseph J. Rolla
Assistant Examiner—Gregory L. Huson
Attorney, Agent, or Firm—James E. Brunton

[57] ABSTRACT

An apparatus for blending two gases together in precisely adjustable proportions. The apparatus includes a mechanically adjustable, blending subassembly adapted to receive the first gas at a predetermined pressure and a one to one force balanced pneumatic relay which is operated by the first gas and which meters the flow of the second gas to the blending subassembly at a pressure substantially equal to the pressure of the first gas being supplied to the blending subassembly.

7 Claims, 2 Drawing Sheets

GAS BLENDING APPARATUS

BACKGROUND OF THE INVENTION

This is a Continuation-In-Part of Copending Application, Ser. No. 07/201,002, filed on June 1, 1988 and now U.S. Pat. No. 4,874,116.

FIELD OF THE INVENTION

The present invention relates generally to an apparatus for controllably blending gases. More particularly the invention concerns an apparatus for blending gases such as nitrogen and carbon dioxide for use in connection with beverage dispensing systems of the character wherein beverage contained in a bulk container is controllably dispensed therefrom by admission of the gas mixture under pressure to the container.

DISCUSSION OF THE PRIOR ART

The use of carbon dioxide gas in the dispensing of beverages such as beer, ale or stout is well known. However, it has been found that for certain applications the use of a mixture of carbon dioxide gas and a second gas, such as nitrogen, provides certain advantages. For example, the use of such a mixture alleviates excessive carbonization of the beverage being dispensed and, when used in dispensing beer, advantageously achieves a stable and creamy head on the beer.

While the advantages of using a gaseous mixture of nitrogen and carbon dioxide in dispensing beer has been known for some time, substantial difficulties have been encountered in designing an accurate, reliable and inexpensive device for mixing the nitrogen and carbon dioxide in the correct proportions. One device which has been suggested to accomplish such mixing is disclosed in U.S. Pat. No. 4,364,493 issued to Raynes et al. However, as will become readily apparent from the descriptions which follow, Raynes et al. approaches the problem in a different way and discloses an apparatus having different components operating in a entirely different manner from those of the present invention.

Due to the novel design of the gas blending component of the apparatus of the present invention, various types of gases can be precisely blended into any desired proportions. Unlike the Raynes et al device, the gas blending component of the present invention is uniquely adjustable so that through the simple manipulation thereof the proportions of the gases being mixed can be quickly and accurately varied within broad ranges.

SUMMARY OF THE INVENTION

The apparatus of the present invention is designed to precisely blend together first and second gases in an adjustable proportion. The gaseous mixture produced is automatically provided, on demand, to an external system, such as a beverage dispensing system, in which the beverage is dispensed from a closed container by the pressure of the gaseous mixture.

The apparatus comprises sources of first and second gases under pressure and three major operating components, or sub-systems, namely a flow control mechanism, a unique one to one force balance pneumatic relay and the gas blending, or flow splitting components.

The pressure control mechanism, which is operated by a first gas, such as carbon dioxide, at a predetermined over pressure, functions to control the flow of the second gas, such as nitrogen, toward the pneumatic relay. This mechanism also controls the flow of the second gas toward the blending component of the apparatus. Typically, the first gas enters the inlet of the control mechanism at a pressure of on the order of ten pounds per square inch greater than the required optimum pressure for dispensing beverage from a container.

The pneumatic relay is operated by the second gas flowing from the outlet of the control mechanism. In a manner presently to be described, the second gas functions to control the flow of the first gas toward the gas blending component. An important aspect of the present invention resides in the fact that the novel design of the pneumatic relay guarantees that as the first and second gases are supplied to the gas blending component, the pressures thereof are always maintained substantially equal. This eliminates the need to match the flow regulation characteristics of the supply pressure regulators which function to regulate the supply of the gases from the gas sources to the system.

Another highly important aspect of the present invention is the unique design of the gas blending, or flow splitter, component of the apparatus. This component comprises a hollow tubular body within which is sealably mounted a sintered stainless steel sleeve which divides the hollow body into inner and outer elongated chambers. The sintered sleeve is sufficiently fine to result in a nearly perfect linear gas flow between the chambers. This unique feature enables the device to operate at high accuracy levels, especially at relatively low gas flow rates. In operation, the second gas enters the first end of the inner chamber at a given pressure while the first gas flowing from the pneumatic relay enters the second, or opposite end of the inner chamber at the same identical pressure. Mounted intermediate the ends of the inner chamber, for reciprocal movement therewithin, is a piston-like element having a peripheral 0-ring which sealably engages the inner wall of the sintered sleeve. With this arrangement, since the supply pressures of the first and second gases flowing into the opposite ends of the inner chamber of the blending mechanism are equal, the amount of the first gas flowing through the sintered sleeve into the outer chamber of the unit, will depend on the position of the piston within the inner chamber. Similarly, the amount of the second gas flowing into the outer chamber for mixing with the first gas will likewise depend upon the position of the piston within the inner chamber. By adjusting the piston axially within the inner chamber, the wall area of the sintered sleeve available for flow through by the first and second gases can be controllably altered to provide the desired mix of the gases in the outer chamber. The gaseous mixture is then available from the second chamber upon demand of the external system.

It is to be observed that since the supply pressures of the first and second gases to the inner chamber are identical, as gas flow is demanded by the external system, the identical pressure drops induced through the wall of the sintered sleeve guarantee that the gas flow of each constituent gas will be directly proportional to the wall area of the sleeve available for that gas to flow through. Because of the novel configuration of the blending mechanism and the laminar flow provided by the sintered sleeve, as the area for flow of the first gas is increased by axial movement of the piston, the area for flow of the second gas is correspondingly decreased. With this construction, it is a simple matter to associate a calibrated scale with the reciprocating, selectively movable piston so that the percentages by volume of the constituent gases in the gaseous mixture can be read directly for each position of the piston within the inner chamber.

Several important safety features of the apparatus such as automatic shut down and feed back control are inherent in the design shown in the drawings. These features will be discussed in detail in the paragraphs which follow.

With the foregoing brief description of the invention in mind, an object of the present invention is to to provide a gas blending device in which first and second gases can readily be blended together in precisely adjustable proportions with the gaseous mixture thus formed being automatically provided to an external system only upon the demand of the external system.

It is another object of the invention to provide a gas blending device of the aforementioned character in which the gases can be precisely blended without the necessity of attempting to match the flow regulation characteristics of supply pressure regulators which regulate the flow of the two gases from the gaseous sources toward the apparatus.

Another object of the invention is to provide a device as described in the preceding paragraphs which includes a novel one to one, force-balanced pneumatic relay which is in communication with the gas blending component of the device and which is operated by the first gas at a predetermined pressure optimum for operation of the external system. Because of the novel force balancing feature of the pneumatic relay, the device meters the flow of the second gas to the blending component at a pressure which is always substantially equal to the operating pressure of the first gas.

A further object of the invention is to provide an apparatus of the character described in which the gas blending component of the apparatus receives the gas from one of the gas sources at an optimum supply system operating pressure, receives the other gas from the pneumatic relay at the same pressure and then precisely mixes the two gases in a proportion determined by the position of a mechanically adjustable, piston-like device sealably carried within the gas blending component.

Still another object of the invention is to provide an apparatus of the type described in the preceding paragraphs which the gas blending component includes a sintered sleeve of a construction that insures laminar flow of the gases through the sleeve into a gas mixing chamber.

Still another object of this invention is to provide a device which includes built-in "interlocking safeties" which positively preclude the flow of either the first or second gas, or an improper or uncontrolled blend of the two gases into the external system. It will be recognized that even a temporary flow of a single gas or an improper blend of the two gases into the external system of keg, seriously damages product quality for all product then in the system. Further, it will be recognized that the normal depletion of either container of pressurized gas will cause this product damaging circumstance to occur. Further, the loss or change of source pressure of either gas occurs normally under conditions where the system is not in totally static balance and:

(1) For example, one of the gas pressures drops as a result of the depletion of one of the sources of supply, or increases as a result of "drift" or other source regulation failure.

(2) The intentional or inadvertent closure (or opening) of a source control or shut-off valve, non-simultaneously with the other source control or shut-off valve; for example at closing time, opening time, shutting down the system preparatory to bottle replacement, restarting the system after bottle replacement, and the like.

Because any source pressure imbalance inevitably causes improperly blended gases to enter the system and induce product-disastrous results, in all circumstances it is necessary, in order to maintain product quality, that all normal connections, disconnections, bottle replacements, system pressure adjustment, start-ups and shutdowns, of the system, be done by highly-trained service personnel. Since the continual attendance and precision training of these personnel is functionally impractical, it is critical that automatic interlocking devices be used with the system to sense pressure source imbalances and automatically induce shut-off. There are, or course, a variety of ways and mechanisms to provide these interlocks by external hardware additions, all of which can malfunction or be removed, and during the period of imbalance, long or short, the "blender" is delivering unblended or improperly blended gases and permanently deteriorating product quality. For reliable and predictable product-safe operation, it is imperative that the interlocks be automatic; inherent in, and not removable from, the blending system or hardware, and highly reliable or fail-safe. Such interlocks are provided by the apparatus of the present invention.

Yet another object of the present invention is to provide an apparatus of the character described in the preceding paragraphs in which superior mixing accuracy, particularly at low gas flow rates through the apparatus, is achieved without generating inordinately high pressure drops at maximum gas flow rates. This is accomplished by providing first and second stages within the gas blending means which controllably mixes the gases flowing into the apparatus. More particularly, in one form of the apparatus of the invention, the total gas flow is divided into two stages, one being the low gas flow rate stage and the other being the high gas flow rate stage.

These and other objects of the invention are realized by the invention, one embodiment of which is shown in the drawings and described in the paragraphs which follow.

DESCRIPTION OF ONE EMBODIMENT OF THE INVENTION

Figure 1:
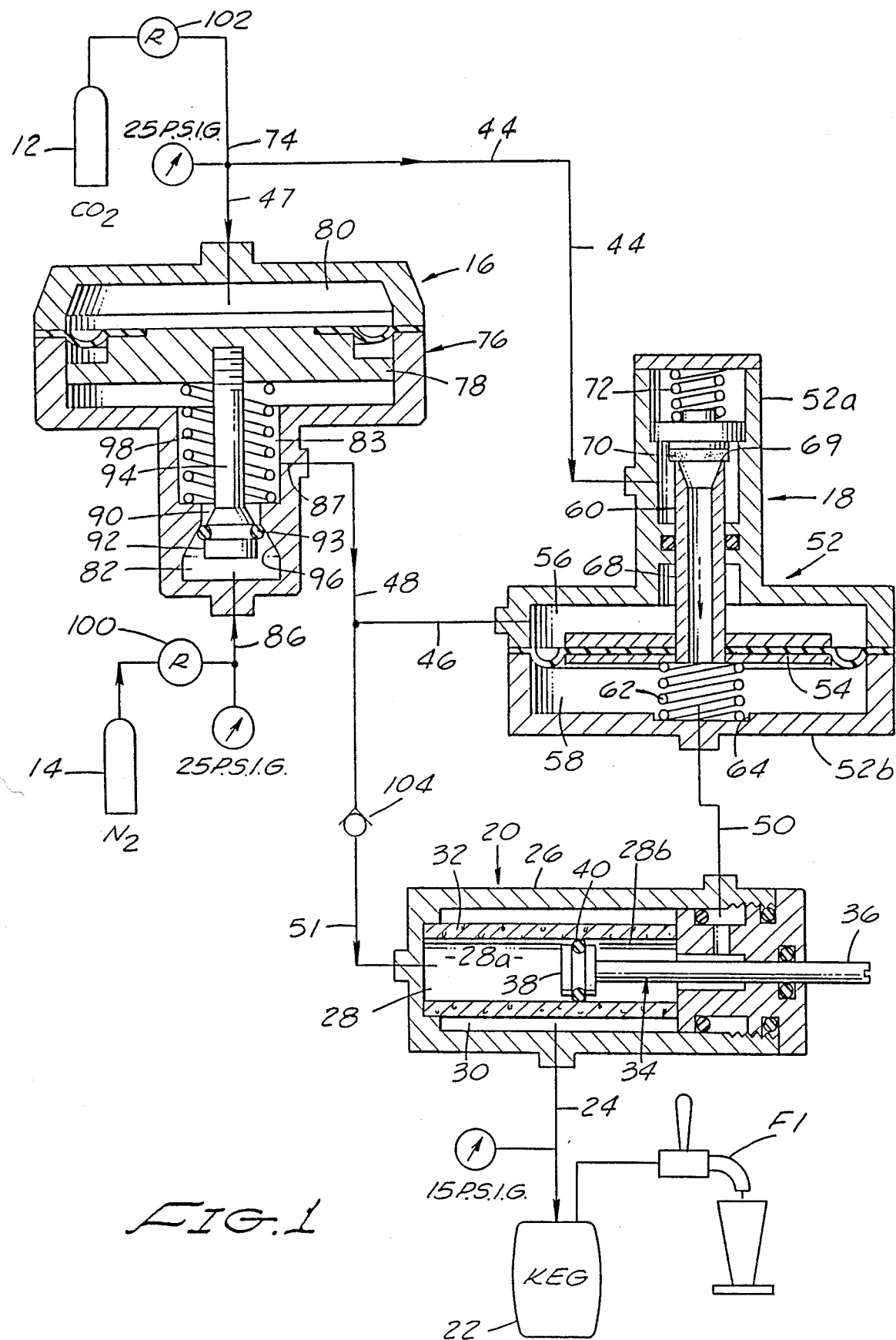
FIG. 1 is a generally schematic representation of the gas blending apparatus of the invention.

Referring to FIG. 1 of the drawings, one embodiment of the invention for supplying a gaseous mixture to an external system on demand is thereshown. In the drawings, the apparatus is shown as forming a part of a beverage dispensing system adapted to dispense beer from a keg. The apparatus comprises a source of a first gas under pressure 12, such as carbon dioxide, a source of a second gas under pressure 14, such as nitrogen, and three major operating sub-systems. These operating sub-systems, which in practice are disposed within a suitable housing, comprise a pressure control mechanism 16, a one to one force balanced pneumatic relay 18 and a gas blending, or flow splitting, means 20. Means 20 functions to controllably mix the first and second gases and is in communication with the keg, or closed container, 22 from which the beverage is to be dispensed by the pressure of the gaseous mixture. Container 22 is in turn interconnected with a dispensing valve arrangement, or beer dispensing faucet in a manner well-known to those skilled in the art. With this construction, the gaseous mixture will flow on demand of the external system from the gas blending means 20 through a conduit 24 and into keg 22 whereby the beer will be forced out of the dispensing faucet Fl.

Referring to the lower portion of FIG. 1, the gas blending means, or mechanism, 20 comprises a housing 26 having a first, or inner, chamber 28 and a second, or outer, chamber 30. These chambers are divided by a porous member, provided here in the form of a sintered stainless steel sleeve 32. Sleeve 32 is tubular in shape and the ends thereof are disposed in sealable engagement with internal walls of the housing 26 using elastomeric 0-rings or other suitable sealing means. Sleeve 32 is constructed of a material having a multiplicity of very fine pores which insure a substantially perfect laminar flow of gases therethrough. With this construction outer chamber 30 takes the form of an elongated, annularly shaped, closed chamber which can communicate only with inner chamber 28 only through the small pores provided in the sintered sleeve 32.

Disposed within inner chamber 28 is a reciprocal means, or piston assembly, 34 which is axially movable within chamber 28 from a first to a second position thereby functioning to divide the inner chamber into first and second portions 28a and 28b of proportionally varying volume. In the present form of the invention, piston assembly 34 comprises an elongated shaft 36 which carries at one end a piston-like member 38 having at its periphery a yieldably resistant elastomeric 0-ring 40 which engages and slides along the inner walls of sleeve 32. Shaft 36 is axially movable in precise increments to cause piston 38 to move axially within chamber 28 in very small, precisely controllable increments.

An important aspect of the apparatus of the invention is the one to one, forced balanced pneumatic relay 18. The inlet of pneumatic relay means 18 is in communication with the first gas source 12 by means of conduit 44. Relay means 18 is also in communication with the second gas source 14 by means of a conduit 46 which in turn communicates with control means 16 via a conduit 48. In a manner presently to be described, second gas 14 uniquely functions as the operating gas which operates the relay to permit the flow of first gas 12 to the gas blending means.

The basic function of the pneumatic relay means is to supply the first gas 12 to the gas blending means 20 upon demand resulting from the beverage being dispensed from the container 22. More particularly, it is the function of the one to one relay to provide the first gas 12 to portion 28b of the chamber 28 of gas blending mechanism via a conduit 50 at a pressure precisely equal to the supply pressure of the second gas 14 which flows through conduit 51 to chamber 28a of the gas blending means via the control means 16.

The pneumatic relay 18 means of the present embodiment of the invention comprises a hollow body 52 having first and second portions 52a and 52b and a first diaphragm 54 mounted within second portion 52b to divide it into first and second pressure chambers 56 and 58 respectively. Chamber 56 is in communication with the flow control mechanism 16 via conduit 46 while the second chamber 58 is in communication with the gas blending means via conduit 50.

The valving means of the pneumatic relay 18 is of unique design and comprises a first pressure port means 60 which is operably associated with diaphragm 54 and functions to control the flow of the first gas 12 into chamber 58. Pressure port means 60 is movable from a closed position to an open position upon movement of the diaphragm 54 from its first at rest position to its second deflected position in response to pressure exerted thereon by the second gas 14 flowing through conduit 46. To yieldably resist movement of the diaphragm toward the second position, there is provided biasing means, shown here in the form of a coiled spring 62 which is disposed intermediate diaphragm 54 and a spring seat 64 which is formed within hollow body 52.

A novel aspect of the pressure port means 60 resides in the construction of the hollow tube 68 which is operably interconnected with diaphragm 54 and which cooperates with an elastomeric seat 70 to positively control the flow of the first gas 12 through the device. Tube 68 is internally chambered to a very sharp peripheral edge 69 which is adapted to pressurally engage seat 70 to provide a leak tight shutoff when the valve means is in its closed position. While sharp edge 69 is extremely effective in providing a leak tight seal, it can also severely damage set 70 if its impact thereon is not cushioned. Accordingly, to provide the necessary cushioning, the elastomeric seat 70 is spring loaded so that if the sharp edge of cylinder 68 engages the seat with any appreciable force, the seat is free to move against the resistance of a second biasing means provided in the form of a coil spring 72 carried internally of portion 52a of the body 52 of the mechanism. With this construction, when the valve means is closed and the sharp edge 69 of cylindrical member 68 moves into sealable engagement with elastomeric seat 70, spring 72 will act as a shock absorber and will permit some movement of the seat so as to prevent any damage thereto which might adversely effect its effectiveness as a positive fluid tight seal. This important safety feature insures a positive and highly reliable non-leak shut off of the relay.

The pressure control mechanism 16 of the present form of the invention comprises a hollow control valve housing 76 within which is mounted a second diaphragm 78. Diaphragm 78 divides housing 76 into first and second chambers 80 and 82 respectively. First chamber 80 has an inlet in communication with the source of the first gas source 12 by means of a conduit 74 which, in turn, is interconnected with conduit 44. In like manner, second chamber 82 is provided with an inlet which is in communication with the source of second gas source 14 under pressure by means of a conduit 86. Second chamber 82 communicates through a valving means with a chamber 83. Chamber 83 is provided with an outlet 87 which is in communication with the gas blending means 20 via conduit 51 and with pneumatic relay means 18 via conduits 46 and 48.

Forming the operating portion of the pressure control means 16 is a second pressure port means 90 which is operably associated with diaphragm 78. Means 90 functions to control the flow of the second gas 14 from chamber 82 to chamber 83 and thence toward the pneumatic relay means upon movement of the second diaphragm 78 from a first closed position to a second open position in response to pressure exerted on the diaphragm by first gas 12. This second pressure port means comprises a valve member 92 which is interconnected with diaphragm 78 by means of a connector member 94. When the valve is in a closed position, elastomeric 0-ring 93 of the valve member 92 is in sealable engagement with a valve seat 96 formed within valve housing 76. To yieldably resist movement of diaphragm 78 toward the valve open position, there is provided biasing means in the form of a coil spring 98 which is disposed intermediate valving member 92 and an interior wall of control valve housing 76. The spring 98 is sized to provide an upward bias force such that at balance the pressure in chamber 83 will always be 10 pounds per square inch (p.s.i.) less than the first gas pressure applied to chamber 80. Thus, if first and second gases are supplied at, for example, 25 p.s.i.g. to the inlets of both the control means and the pneumatic relay means. The pneumatic relay means output (CO 2) will also be exactly 15 p.s.i.g. to chamber 28b of the gas blending means. This arrangement makes it possible to use the first gas (CO 2) as the primary pressure signal source for the complete system. This is a significant advantage, since the CO 2 is by far the more stable of the two gas sources.

In operation the regulator 100 which regulates the flow of the second gas 14 toward the pressure control means, is set then p.s.i. higher than the required operating pressure optimum for dispensing the beverage from container 22. At the same time, the regulator 102, which regulates the flow of the first ga 12 toward th pressure control means and the pneumatic relay means, is also set to approximately ten p.s.i. higher than the required optimum pressure for dispensing the beverage from container 22. The overpressure of the first gas 12 accomplishes two things. First, the gas 12 at an overpressure will flow through conduit 47 into chamber 80 of the pressure control means. This will cause diaphragm 78 to deflect in a manner which will separate valve member 92 from seat 96 permitting gas to flow from chamber 80 into chamber 83 an thence into outlet conduit 48. Secondly, and simultaneously, gas 12 flowing at the overpressure will flow through conduit 44 into the inlet of pneumatic relay 18.

The second gas 14 flowing outwardly from the control means 16 through conduit 48 will flow into chamber 28a of the gas blending subassembly via conduit 51 at the prescribed beverage dispensing operating pressure. The second gas 14 will also flow through conduit 46 into chamber 56 of the pneumatic relay means. The second gas flowing into chamber 56 will cause deflection of diaphragm 54 moving cylinder 68 away from seat 69, thus permitting the first gas 12, which is flowing into the pneumatic relay means via conduit 44, to flow past seat 70 into the passageway cylinder 68 and thence into chamber 58 of the pneumatic relay means. The first gas will then flow from chamber 58 through conduit 50 into chamber 28b of the gas blending or flow-splitting mechanism. It is important to note that should the pressure of the gas within chamber 58 exceed the pressure of the second gas flowing into chamber 56, the diaphragm will be deflected in a manner to close the pressure port means 60. It therefore follows that with the unique design of the pneumatic relay means the first gas flowing from the relay means toward the gas blending mechanism will always be at a pressure identical to the pressure of the second gas 14, which functions as the operating gas flowing into chamber 56 to deflect diaphragm 54 into a valve opening position. This highly unique feature of the pneumatic relay means of the invention guarantees that the first gas flowing into chamber 28b of the gas blending mechanism will be at an identical pressure to that of th second gas 14 flowing into chamber 28a of the gas blending mechanism.

As previously mentioned, the present system is a demand system. No gas flow will occur unless the external system, in this case the beer dispensing system, is open to cause flow of beer through the dispensing faucet connected to the keg. When this happens the first and second gases will flow into the keg or container 22 through conduit 24 to replace the beer which is being drawn off. Since the pressures of the first and second gases are identical, the amount of the first gas flowing through the system will depend upon the position of the piston 38 within the internal chamber 28 of the gas blending mechanism. Similarly, the amount of the second gas flowing through the system will likewise depend on the position of the piston 38 within internal chamber 28. Thus, it is obvious that by adjusting the position of the piston 38, axially within the internal chamber 28, the ratio of the area of the sintered sleeve available for flow of first gas to that available for flow of the second gas can be precisely adjusted to provide the desired gaseous mixture. Because the pressures of the first and second gases in chamber 28 are precisely identical as flow is demanded by downstream conditions, the identical pressure drips induced through the wall of the sintered sleeve 32 guarantees that the gas flow of each constituent gas will be directly proportional to the wall area available for flow of that gas between the first or inner chamber 28 and the second or outer chamber 30 of the gas blending device. As previously mentioned, the micron rating of the sintered sleeve 32 is sufficiently fine to result in a linear flow versus pressure drop relationship. Accordingly, the gaseous mixture flowing through conduit 24 toward the external system can be extremely accurately and precisely controlled. It is to be noted that an inherent feature of the unique design of the gas blending means is the fact that as the area for flow of the second gas between chambers 28 and 30 is increased, the area for flow of the first gas is correspondingly decreased. This enables one to affix a calibrated scale to th shaft 36 of the piston assembly so as to read directly the percentages of the first and second gases which make up the gaseous mixture for any given position of the piston 38 within inner chamber 28.

In actual operation, the range of adjustment of the device for use in dispensing beer is from about 20 per cent to 85 per cent by volume of the first gas, or carbon dioxide to the total volume of the gas mixture.

For example, where the gases are C02 and N2:

$$\% \; CO_2 = \frac{\text{Volume } CO_2}{\text{Volume } CO_2 + \text{Volume } N_2}$$

It is to be understood, however, that when the apparatus of the invention is used for other applications, the range of percentages of the first and second gases, which make up the gaseous mixture, can be widely varied for particular applications.

Another important safety aspect of the apparatus of the present invention resides in the automatic shutoff capability of the pressure control means. As previously mentioned, this means is constructed so that unless the pressure of the first gas flowing into chamber 80 is on the order of about 10 pounds per square inch greater than the pressure of the second gas flowing into chamber 82, the valve will automatically be closed by spring 98. When the flow control means is thus closed, the second gas 14 cannot flow toward the signal side 56 of the pneumatic relay. Under these conditions the system will automatically shut itself down.

If the source of the first gas should become depleted, the pressure control means will automatically move into a closed position, thus preventing any flow of the second gas toward the pneumatic relay means. In similar fashion, should the source of the second gas 14 become depleted, the system will also automatically shut down, since the second gas flowing through conduit 46 into chamber 56 of the pneumatic relay will limit the flow of the first gas 12 through the relay toward the gas mixing mechanism. This unique inter-relationship between the major operating sub-systems of the apparatus renders the system completely safe in operation.

Still another important safety feature of the apparatus of the present invention resides in the provision of a third valving means provided here as a check valve 104. If the pneumatic relay configuration is incorrect, it is possible that the output pressure of the first gas 12 may be slightly higher than the input pressure of the second gas 14. In such a case, the slightly higher output pressure could feed back to the input side of the device and further increase the output pressure of the second gas. Depending upon the amount of initial positive imbalance, given time the output pressure of the second gas would creep up to the value of the second gas supply pressure. The check valve 104 uniquely and effectively prevents this from occurring.

The previously discussed design of the valving means of the pneumatic relay comprises yet another important safety feature of the apparatus. For example, should the conduit supplying the second gas under pressure to the apparatus break of become disconnected, thereby ceasing the flow of gas into chamber 56, the resulting imbalance would drive the hollow tube 68 and its sharp peripheral edge 69 into the elastomeric seat 70 destroying its effectiveness. However, as previously discussed, the incorporation of biasing means, or spring, 72 into the device so as to act as a shock absorber, this catastrophic failure of the elastomeric seat 70 is effectively prevented.

With the unique system thus described, it is apparent that the apparatus of the invention can readily be used by unskilled persons with a minimum of training to accomplish the precise and accurate blending of two gases into a gaseous mixture which may be used to supply an external demand system. Because of the design of the gas blending means, the piston assembly can be precisely adjusted so as to position the piston 38 within chamber 28 to proportionately vary the wall area of sleeve 32 available for the flow of the first and second gases into exterior chamber 30. Because of the unique design of the pneumatic relay means, the pressures of the first and second gases continuously track one another and result in the desired gaseous mixture independent of the rate of flow of the first and second gases to the gas blending means.

DESCRIPTION OF A SECOND EMBODIMENT OF THE INVENTION

Figure 2:
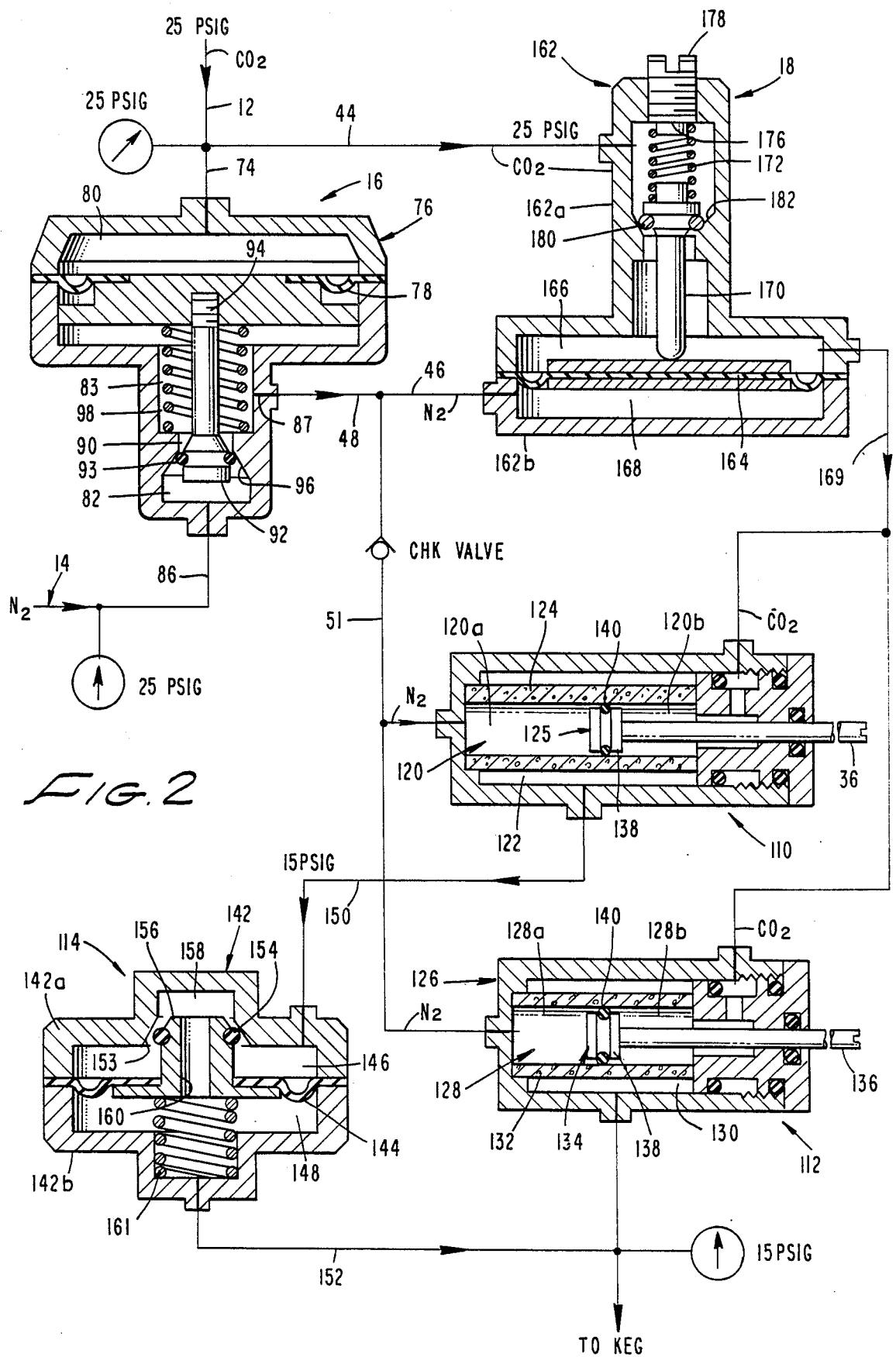
FIG. 2 is a generally schematic representation of an alternate form of the gas blending apparatus o the invention.

Referring to FIG. 2 of the drawings, an alternate embodiment of the invention is thereshown. The apparatus is similar in many respects to the embodiment described in the preceding paragraphs and like numerals are used in FIG. 2 to identify like components.

However, in the apparatus shown in FIG. 2, two restrictive elements, or porous members, rather than one, are provided. The reason for adding the second member is that in almost any pneumatic device relying on some sort of restriction for flow control, the best accuracy, particularly at low flow rates, is obtained by employing a restrictive element having a very steep pressure drop versus flow characteristic. The usual disadvantage of this approach is that at full scale flow rates, the resulting high pressure drop across the device is unacceptable. Therefore, it becomes a very practical objective to achieve low flow accuracy without generating an inordinately high pressure drop at the maximum rated flow of such apparatus.

This is accomplished by dividing the total maximum flow rate into two stages, one being a first, or low, flow stage and the other being a second, or high, flow stage. The method of operation of these two stages, and their inter-relationship with the other sub-systems of this second form of the invention, will presently be discussed.

The apparatus of this second embodiment of the invention comprises a source of a first gas under pressure 12, such as carbon dioxide, a source of a second gas under pressure 14, such as nitrogen, and five major operating sub-systems. These major operating sub-systems, which in practice are disposed within a suitable compact housing, comprise a pressure control mechanism 16, a one-to-one force balanced pneumatic relay 18, a gas blending, or flow splitting, means having high and low flow rate stages 110 and 112, and a differential pressure control means here provided as a differential pressure controller 114.

The gas blending means functions to controllably mix the first and second gases and is in communication with the keg, or other closed container, from which the beverage is to be dispensed by the pressure of the gaseous mixture. The keg, is in turn, interconnected with a dispensing valve arrangement, or beer dispensing faucet (not shown) in a manner well-known to those skilled in the art. With this construction, the gaseous mixture will flow on demand of the external system from the gas blending means through a conduit 116 and into the keg whereby the beer will be forced out of the dispensing faucet.

Referring to the lower, right-hand portion of FIG. 2, the high flow stage 110 of the gas blending means comprises a housing 118 having a first, or inner, chamber 120 and a second, or outer, chamber 122. These chambers are divided by a porous member, provided here in the form of a sintered stainless steel sleeve 124. Sleeve 124 is tubular in shape and the ends thereof are disposed in sealable engagement with internal walls of the housing 118 using elastomeric 0-rings or other suitable sealing means. Sleeve 124 is constructed of a material having a multiplicity of very fine pores which insure a substantially perfect laminar flow of gases therethrough. With this construction, outer chamber 122 takes the form of an elongated, annularly shaped, closed chamber which can communicate only with inner chamber 120 only through the small pores provided in the sintered sleeve 124.

Disposed within inner chamber 120 is a reciprocal means, or piston assembly 124, which is axially movable within chamber 120 from a first to a second position, thereby functioning to divide the inner chamber into first and second portions 120a and 120b of proportionally varying volume.

The low flow stage 112 of the gas blending means comprises a housing 126 having a first, or inner, chamber 128 and a second, or outer, chamber 130. These chambers are divided by a porous member, provided here in the form of a sintered stainless steel sleeve 132. Sleeve 132 is tubular in shape and the ends thereof are disposed in sealable engagement with internal walls of the housing 126 using elastomeric 0-rings or other suitable sealing means. Sleeve 132, like sleeve 124, is constructed of a material having a multiplicity of very fine pores, but offering a different impedance from that of sleeve 124. With this construction, outer chamber 130 takes the form of an elongated, annularly shaped, closed chamber which can communicate only with inner chamber 128 only through the small pores provided in the sintered sleeve 132.

Disposed within inner chamber 128, is a reciprocal means, or piston assembly 134, which is axially movable within chamber 128 from a first to a second position, thereby functioning to divide the inner chamber into first and second portions 128a and 128b of proportionally varying volume.

In this second form of the invention, both piston assemblies comprise an elongated shaft 136 which carries at one end a piston-like member 138 having at it periphery a yieldably resistant elastomeric 0-ring 140 which engages and slides along the inner walls of the sleeves 124 and 132. The shafts are axially movable in precise increments to cause the pistons 138 to move axially within their respective chambers in very small, precisely controllable increments.

As in the earlier described apparatus of the invention, this second form of the invention also includes the one to one, forced balanced pneumatic relay 18. The inlet of pneumatic relay means 18 is in communication with the first gas source 12 by means of conduit 44. Relay means 18 is also in communication with the second gas source 14 by means of a conduit 46 which in turn communicates with control means 16 via a conduit 48. Once again, the second gas 14 functions as the operating gas which operates the relay to permit the flow of first gas 12 to the gas blending means. The basic function of the pneumatic relay means is to supply the first gas 12 to the gas blending means upon demand resulting from the beverage being dispensed from the container 22.

The fifth subsystem of this second form of the apparatus of the invention, namely the differential pressure controller 114, functions to separate the operation of the two stages 110 and 112 of the gas blending means, Controller 114 comprises a hollow body 142 having first and second interconnected body portions 142a and 142b, and a diaphragm 144 disposed intermediate thereof. Diaphragm 144 divides hollow body 142 into two chamber 146 and 148. Chamber 146 is in communication with first stage 110 of the gas blending means via conduit 150 and chamber 148 is in communication with the keg via conduit 152.

Portion 142a is provided with an internal valve seat 153 which is inter-engaged by an 0-ring 154 carried by a valving member 156. Valving member 156 is operably associated with diaphragm 144 and functions to control the flow of gas from chamber 146 into a subchamber 158 and through a central passageway 160 provided in the valving member, which passageway is in communication with chamber 148. A control biasing means, shown here as a spring 161, is carried within chamber 148 and functions to normally urge 0-ring 154 into sealing engagement with seat 152. So long as the gas pressure within chamber 146 is less than the gas pressure within chamber 148, plus the pressure exerted by spring 161 on diaphragm 144, the valve member 156 will remain in engagement with seat 152 blocking the flow of gas toward the keg. However, upon a pressure drop within the keg of a predetermined magnitude, the valve member will move away from seat 152 permitting gas to flow from stage 110 toward the keg.

The pneumatic relay means 18 of the present embodiment of the invention comprises a hollow body 162 having first and second portions 162a and 162b and a first diaphragm 164 mounted within second portion 162b to divide it into first and second pressure chambers 166 and 168 respectively. Chamber 168 is in communication with subsystem 16 via conduit 46, while chamber 166 is in communication with the gas blending means via a conduit 169.

The valving means of the pneumatic relay 18 is of unique design and comprises a first pressure port means, or valve member 170, which is operably associated with diaphragm 164 and functions to control the flow of the first gas 12 into chamber 166. Valve member 170 is movable from a closed position to an open position upon movement of the diaphragm 164 from its first at rest position to its second deflected position in response to pressure exerted thereon by the second gas 14 flowing through conduit 46. To yieldably resist movement of the diaphragm toward the second position, there is provided biasing means, shown here in the form of a coiled spring 172, which is disposed intermediate valve member 170 and a spring seat 176 which is formed by the lower surface of a threaded adjustment member 178. Member 178 is threadably receivable within portion 162a of hollow body 162 so that the compressive forces exerted by spring 172 can be precisely adjusted.

Valve member 170 carries an 0-ring 180 which is adapted to sealably engage a valve seat 182 formed internally of portion 162a. In operation, when the force of the gas 14 acting upon diaphragm 164 is sufficient to overcome the urging of spring 172, the gas 12 will flow past seat 182 into chamber 166 and will act against diaphragm 164 to tend to counterbalance the force of gas 14 acting on the opposite side of diaphragm 164.

The pressure control mechanism 16 of this second form of the invention is identical to that of the first form of the invention and comprises a hollow control valve housing 76 within which is mounted a second diaphragm 78. Diaphragm 78 divides housing 76 into first and second chambers 80 and 82 respectively. First chamber 80 has an inlet in communication with the source of the first gas source 12 by means of a conduit 74 which, in turn, is interconnected with conduit 44. In like manner, second chamber 82 is provided with an inlet which is in communication with the source of second gas source 14 under pressure by means of a conduit 86. Second chamber 82 communicates through a valving means with a chamber 83. Chamber 83 is provided with an outlet 87 which is in communication with the gas blending means via a conduit 51 and with the pneumatic relay means via conduits 46 and 48.

Forming the operating portion of the pressure control means 16 is a second pressure port means 90 comprising a second valve member 92 which is operably associated with diaphragm 78. Means 90 functions to control the flow of the second gas 14 from chamber 82 to chamber 83 and thence toward the pneumatic relay means upon movement of the second diaphragm 78 from a first closed position to a second open position in response to pressure exerted on the diaphragm by first gas 12. Second valve member 92 is interconnected with diaphragm 78 by means of a connector stem 94. When the valve is in a closed position, elastomeric 0-ring 93 of the valve member 92 is in sealable engagement with a valve seat 96 formed within valve housing 76.

To yieldably resist movement of diaphragm 78 toward the valve open position, there is provided biasing means in the form of a coil spring 98 which is disposed intermediate valving member 92 and an interior wall of control valve housing 76. The spring 98 is sized to provide an upward bias force such that at balance the pressure in chamber 83 will always be 10 pounds per square inch (p.s.i.) less than the first gas pressure applied to chamber 80. Thus, if first and second gases are supplied at, for example, 25 p.s.i.g. to the inlets of both the control means and the pneumatic relay means, the output of the control means will be 15 p.s.i.g.. this pressure (N2) feeds both chambers 120a and 128a of the first and second stages of the blending means, as well as input chamber 168 of the pneumatic relay means. The pneumatic relay means output (CO 2) will also be exactly 15 p.s.i.g. to chambers 120b and 128b of the first and second stages of the gas blending means. This arrangement makes it possible to use the first gas (CO 2) as the primary pressure signal source for the complete system.

In operation, the regulator which regulates the flow of the second gas 14 toward the pressure control means, is set ten p.s.i. higher than the required operating pressure optimum for dispensing the beverage from the keg, for example 25 p.s.i.g.. At the same time, the regulator which regulates the flow of the first gas 12 toward the pressure control means and the pneumatic relay means, is also set to approximately ten p.s.i. higher than the required optimum pressure for dispensing the beverage from the keg, for example 25 p.s.i.g.. The overpressure of the first gas 12 accomplishes two things. First, the gas 12 at an overpressure will flow though conduit 74 into chamber 80 of the pressure control means. This will cause diaphragm 78 to deflect in a manner which will separate valve member 92 from seat 96, permitting gas to flow from chamber 80 into chamber 83 and thence into outlet conduit 48. Secondly, and simultaneously, gas 12 flowing at the overpressure will flow through conduit 44 into the inlet of pneumatic relay 18.

The second gas 14 flowing outwardly from the control means 16 through conduit 48 will flow into chambers 120a and 128a of the high and low flow stages of the gas blending means via conduit 51 at the prescribed beverage dispensing operating pressure. The second gas 14 will also flow through conduit 46 into chamber 168 of the pneumatic relay means. The second gas flowing into chamber 168 will cause deflection of diaphragm 164, moving 0-ring 180 away from seat 182, thus permitting the first gas 12, which is flowing into the pneumatic relay means via conduit 44, to flow past seat 182 into chamber 166 of the pneumatic relay means. The first gas will then flow from chamber 166 through conduit 169 into chambers 120b and 128b of the high and low flow and second stages of the gas blending or flow-splitting mechanism. It is important to note that, should the pressure of the gas within chamber 166 exceed the pressure of the second gas flowing into chamber 168, the diaphragm will be deflected in a manner to move the valve member 170 into a closed position. It therefore follows that with the unique design of the pneumatic relay means, the first gas flowing from the relay means toward the gas blending means will always be at a pressure identical to the pressure of the second gas 14, which functions as the operating ga flowing into chamber 168 to deflect diaphragm 164 into a valve opening position.

In operating the second embodiment of the invention shown in FIG. 2, assume for purposes of illustration that the low gas flow rate will be on the order of 20% of the maximum rated gas flow rate. Assume, also, that the total gas flow rate will be 10 liters/minute, and the corresponding pressure drop will be on the order of 2 p.s.i.. It follows then that the first stage pressure/flow characteristic will be approximately 2 p.s.i./2 liters/minute and the second stage will be 2 p.s.i./10 liters/minute.

In order to separate the operation of the two stages 110 and 112, the differential pressure controller 114 must be included in the apparatus in the manner shown in FIG. 2. In accordance with the aforementioned assumptions, the nature of controller 114 is such that it remains closed at differentials of 2 p.s.i. or less. The result of this is that at gas flow rates less than 2 liters/minute, the flow will be solely through low flow stage 112, stage 110 being cut off by controller 114. At low flow rates then, any tracking error in the relay 18 will be substantially reduced because of the steep pressure/flow characteristic of the low flow stage. To illustrate, assume a flow rate of 0.5 liter/minute. Assume, also, that the $CO_2$ pressure delivered by relay 18 differs from the $N_2$ pressure by 0.5 inches of water. Since, at this flow rate the drop across the low flow splitter is 0.5 p.s.i. (14 inches of water) the blend will be in error by 0.5/ 14 or 3.57% of the adjusted blend. If the blend happens to be set at 30%, the resulting error would produce a blend of 30 plus or minus 1.07%. If the high flow rate stage were used for this flow rate, the error would be 0.5/2.8" $H_2O$ or 17.86%. At a 30% blend, the result would be 30+5.36% or 5 times the error occurring in the first case.

Considering now the situation wherein the total flow rate is such that the high-flow stage 110 has come into operation, but is passing only a small portion of the total flow rate. By way of example, assume a total flow rate of 2.5 liters/minute. Two (2) liters/minute will pass through the low-flow stage 112 and 0.5 liters/minute through the high-flow state 110, combining in the outlet passage for a total of 2.5 liters/minute. As before, the assumed error at 0.5 liters/minute through the high-flow stage will be 0.5/ 28 inches of $H_2$ or 17.86% of the adjusted blend. The arithmetic is as follows:

$$30\% \times .1786 = +5.36\% \text{ absolute error}$$

$$\text{Final blend} = \frac{2(30) + 0.5(30 + 5.36)}{2.5} = 30 + 1.07\%$$

If the total flow of 2.5 liters/minute were passing through the high-flow stage alone, it can be shown that the final blend would be 30+1.07%.

The foregoing makes it clear that the use of this two-stage approach provides markedly improved low flow rate blend accuracy without any degradation in the accuracy of higher flow rates. Further, this is achieved without encountering an unacceptably high overall pressure drop.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. An apparatus for supplying a gaseous mixture to an external system on demand, comprising:
   (a) a source of a first gas under pressure;
   (b) a source of a second gas under pressure;
   (c) a gas blanding means in communication with the external system and in communication with said sources of said first and second gases for adjustably blending said gases into a gaseous mixture of predetermined proportions and for supplying said gaseous mixture to the external system on demand, said gas blending means comprising a high flow rate stage and a low flow rate stage;
   (d) pneumatic rely means in communication with said high flow rate and low flow rate stages of said gas blending means and said sources of said first and second gases for supplying said second gas to said gas blending means on the demand of the external system, said pneumatic rely means including first valving means operable by said first gas under pressure for controlling the flow of said second gas to said gas blending means upon the demand of the external system;
   (e) differential pressure control means in communication with said high flow rate stage of said gas blending means and with said external system for controlling the flow of gases between said high flow rate stage and said external system; and
   (f) control means in communication with said sources of said first and second gases for controlling the flow of said first gas to said pneumatic rely means, said control means including second valving means operable by said second gas under a predetermined elevated pressure for controlling the flow of said first gas to said pneumatic rely means.

2. An apparatus as defined in claim 1 in which said differential pressure control means permits gas flow to said external system only when rate of fluid flow through said low rate stage exceeds a predetermined amount.

3. An apparatus as defined in claim 1 in which said differential pressure control means comprises a first chamber having an inlet connected to said high flow rate stage, a second chamber having a gas outlet connected to said external system and a valving means disposed intermediate said first and second chambers for preventing gas under pressure from flowing through said gas inlet toward said gas outlet.

4. An apparatus as defined in claim 3 in which said differential pressure control means further includes biasing means for yieldably maintaining said valving member in a closed position until the gas pressure within said first chamber exceeds the gas pressure within said second chamber by a predetermined amount.

5. An apparatus as defined in claim 3 in which said high flow rate stage of said gas blending means comprises:
   (a) a hollow housing;
   (b) a porous member disposed within said hollow housing so as to define first and second contiguous chambers;
   (c) a first inlet to said first chamber in communication with said source of said first gas;
   (d) a second inlet to said first chamber in communication with said source of said second gas;
   (e) reciprocal means disposed in sealable engagement with said porous member for reciprocal movement within said first chamber said reciprocal means being disposed intermediate said first and second inlets; and
   (f) an outlet from said second chamber in communication with said inlet of said differential pressure flow control means.

6. An apparatus as defined in claim 5 in which said low flow rate stage of said gas blending means comprises:
   (a) a hollow housing;
   (b) a porous member disposed within said hollow housing so as to define first and second contiguous chambers;
   (c) a first inlet to said first chamber in communication with said source of said first gas and in communication with said first inlet of said high flow rate stage;
   (d) a second inlet to said first chamber in communication with said source of said second gas;
   (e) reciprocal means disposed in sealable engagement with said porous member for reciprocal movement within said first chamber said reciprocal means being disposed intermediate said first and second inlets; and
   (f) an outlet from said second chamber in communication with the external system.

7. An apparatus as defined in claim 6 including a check valve disposed intermediate said control means and said high flow rate stage of said gas blending means for preventing the flow of gas in a direction from said high flow rate stage toward said control means.

* * * * *